United States Patent
Shryock

[19]

[11] Patent Number: 6,059,376
[45] Date of Patent: May 9, 2000

[54] UNIVERSAL MOUNT FOR TIRE RIMS

[75] Inventor: John A. Shryock, Brandon, Fla.

[73] Assignee: I.W.C. International, Inc., Tampa, Fla.

[21] Appl. No.: 09/193,178

[22] Filed: Nov. 16, 1998

[51] Int. Cl.$^7$ ........................................ B60B 7/10
[52] U.S. Cl. .................... 301/37.37; 301/37.31; 301/37.34
[58] Field of Search .................. 301/37.1, 37.31, 301/37.42, 37.34, 108.4, 37.35, 37.36, 37.37

[56] References Cited

U.S. PATENT DOCUMENTS

| | | |
|---|---|---|
| 1,390,425 | 9/1921 | Blair .......................................... 301/37.1 |
| 2,561,160 | 7/1951 | Weasler ................................. 301/37.34 |
| 2,722,460 | 11/1955 | Dieterich . |
| 2,827,332 | 3/1958 | Chamberlin .......................... 301/37.34 |
| 3,036,867 | 5/1962 | Lyon . |
| 3,389,937 | 6/1968 | Brumfield . |
| 4,229,047 | 10/1980 | Beisch ................................... 301/37.1 |
| 4,596,425 | 6/1986 | Hung ..................................... 301/37.42 |
| 4,735,460 | 4/1988 | Tomida et al. ........................... 301/37.1 |
| 4,822,109 | 4/1989 | Feria ..................................... 301/37.35 |
| 5,042,881 | 8/1991 | Polka . |
| 5,490,342 | 2/1996 | Rutterman et al. . |
| 5,623,777 | 4/1997 | Hsiao et al. . |
| 5,659,989 | 8/1997 | Hsiao et al. . |
| 5,718,484 | 2/1998 | Sheu ..................................... 301/37.33 |

FOREIGN PATENT DOCUMENTS

| | | |
|---|---|---|
| 215583 | 3/1958 | Australia . |
| 0 187 228 | 11/1985 | European Pat. Off. . |
| 462025 | 2/1937 | United Kingdom . |

*Primary Examiner*—S. Joseph Morano
*Assistant Examiner*—Long Bao Nguyen
*Attorney, Agent, or Firm*—Larson & Larson, P.A.; James E. Larson

[57] ABSTRACT

A universal mount for tire rims includes a plurality of clips mounted peripherally of a wheel cover. A first type of clip consists of a clip member mounted in a clip housing guided in linear movements on a shaft and having a distal end with an arcuate termination designed to fit over a peripheral surface on a wheel. The proximal end of the clip member has an undulating portion with each horizontal surface having a hole, the holes being aligned with one another so that a guide shaft may extend through the holes to guide the clip member in vertical movements. Also mounted on the shaft are two coil springs, one mounted above the proximal end of the clip member, and one mounted below the proximal end of the clip member. In a second type of clip, the shaft is threaded and holes in the proximal undulating portion of the clip member are threaded and receive the threaded shaft. In this way, the threaded shaft prevents free vertical movements of the clip member. The second type of clip may be used to positively lock a wheel cover over a peripheral surface of a wheel rim.

20 Claims, 7 Drawing Sheets

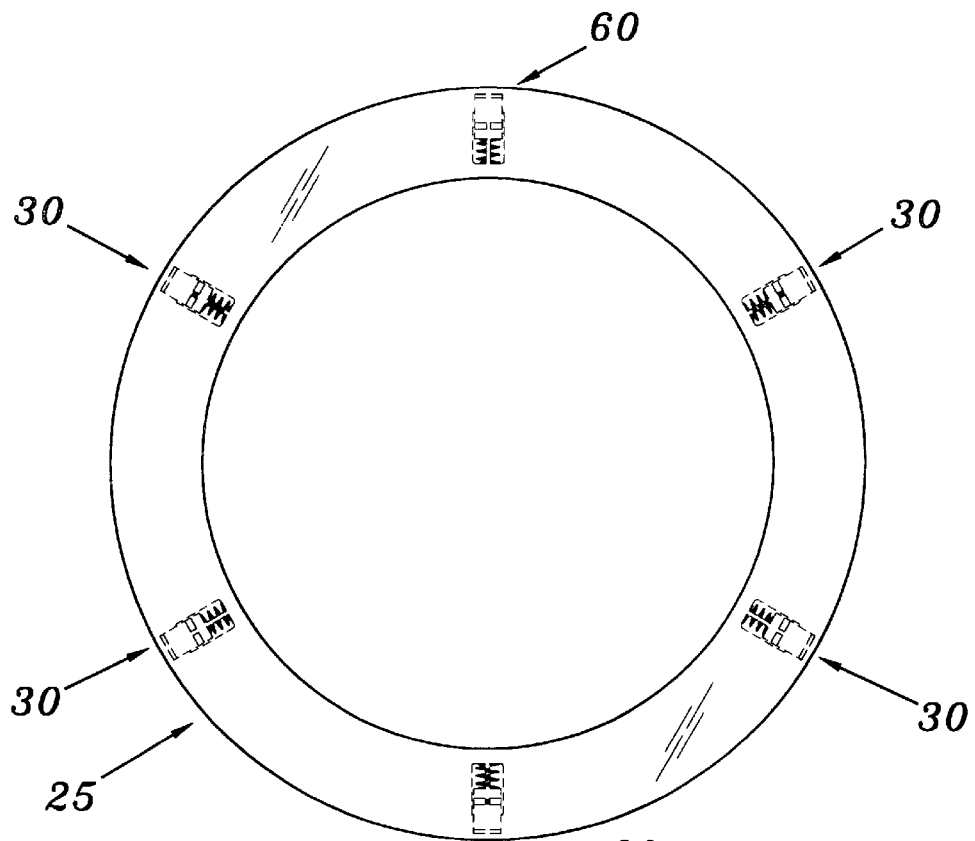
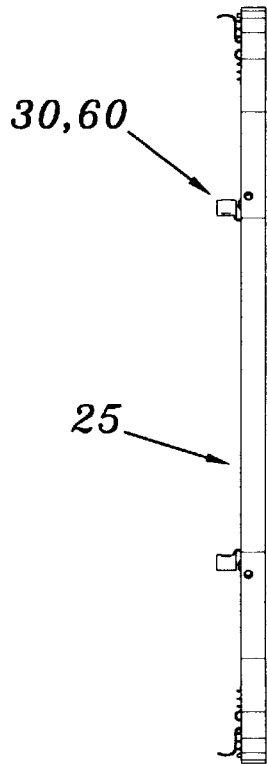
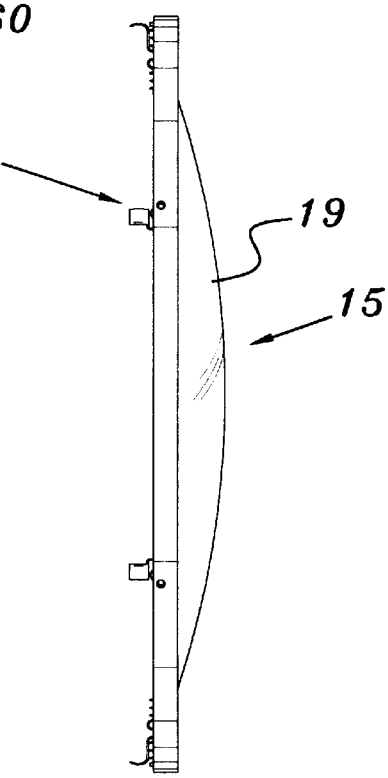
FIG. 5
FIG. 6
FIG. 7

6,059,376

UNIVERSAL MOUNT FOR TIRE RIMS

BACKGROUND OF THE INVENTION

This invention relates to hub caps and mounts attached to tire rims. More particularly, it refers to a universal mount for attachment to tire rims. The mount is intended to be installed on a hubcap so that the hubcap can be removably affixed to any type of wheel rim. Hubcaps are well known vehicle accessories that are typically installed on a wheel to which a tire is mounted for aesthetic purposes, particularly to shield or hide the threaded nuts holding the wheel on the vehicle axle and also because the middle of a typical wheel is not aesthetically pleasing.

The typical hubcap is installed on the typical wheel through an interference fit between a peripheral rim of the hubcap and a peripheral surface of the wheel. FIG. 1 depicts a typical prior art situation wherein a wheel 1 includes a peripheral surface 2 as well as a central surface 3 having openings 4 through which wheel mounting bolts 5 protrude with threaded nuts 6 threaded onto the bolts 5 to hold the wheel on the axle 7 of the associated vehicle. A prior art hubcap 8 has a peripheral axially extending portion 9 that engages the surface 2 of the wheel 1 in an interference fit. As should be understood from FIG. 1, the hubcap 8 is specifically sized and configured so that it may only be removably affixed to a wheel such as the wheel 1 having the particular surface 2 incorporated therewith. Unless the wheel 1 has the configuration shown in FIG. 1, the hubcap 8 may not be installed thereon.

A need has developed for a universal mount that will enable a hubcap to be affixed to any one of a number of configurations of wheels including MAG wheels. It is with this need in mind that the present invention was developed.

The following prior art is known to Applicant:

U.S. Pat. No. 2,722,460 to Dieterich discloses a fastening device for spoke simulating shrouds that includes a clip surrounding a peripheral ring on a hubcap and a further clip having a distal end affixed to a surface of a wheel with the further clip attached to the first-mentioned clip by a screw extending through an opening in the further clip and threadably attached to the first-mentioned clip. The present invention differs from the teachings of Dieterich as contemplating two types of clips, one that floats between two springs in a holder and the other of which may be tightened down through the use of a threaded screw.

U.S. Pat. No. 3,389,937 to Brumfield discloses a wheel cover having a plurality of peripherally spaced clips to affix the wheel cover to a wheel. The present invention differs from the teachings of Brumfield as contemplating means for adjusting the position of each clip and allowing them to accommodate to wheels of differing dimensions.

Applicant is also aware of U.S. Pat. No. 5,659,989 to Hsiao et al. Hsiao et al. disclose a wheel cover having a peripheral configuration similar to that which is depicted in prior art FIG. 1 herein. The present invention may be employed as a modification to a wheel cover such as that which is disclosed by Hsiao et al. to adapt the Hsiao et al. wheel cover to wheels of differing dimensions.

SUMMARY OF THE INVENTION

The present invention relates to a universal mount for tire rims. The present invention includes the following interrelated objects, aspects and features:

(1) In a first aspect, the present invention includes a plurality of clips mounted peripherally of a wheel cover. Any number of such clips, as desired, may be mounted about the periphery of a wheel cover although four, six or eight such clips are the preferred numbers.

(2) In any event, whether four, six or eight clips are employed, in the preferred embodiment, clips of two differing types are employed.

(3) A first type of clip employed consists of a clip member mounted in a clip housing guided in linear movements on a shaft that are radial with respect to the wheel cover. The clip member has a distal end with an arcuate termination designed to fit over a peripheral surface on a wheel. The proximal end of the clip member has an undulating portion with each horizontal surface thereof having a hole with the holes being aligned with one another so that a guide shaft may extend therethrough to guide the clip member in vertical movements. Also mounted on the shaft are two coil springs, one mounted above the proximal end of the clip member, and one mounted below the proximal end of the clip member. These springs comprise means for maintaining and balancing the position of the proximal end of the clip member but allow it to freely move up and down against the force of the springs in each direction. This action allows the vertical (and radial) position of the clip member to easily be adjusted to accommodate to peripheral surfaces on wheel rims of differing configurations.

(4) A second type of clip is similar to the first type of clip. The main difference lies in replacing the guide shaft with a threaded shaft having one end with a tool receiving recess. The holes in the proximal undulating portion of the clip member are threaded and threadably receive the threaded shaft to provide means for maintaining clip member position. In this way, the threaded shaft prevents free vertical movements of the clip member, however, rotations of the threaded shaft by inserting an appropriate tool end within the tool receiving recess of the threaded shaft and rotating the threaded shaft cause controlled reciprocation of the clip member either up or down (radially outwardly or inwardly, respectively) to fixedly adjust the position of the clip member radially of the wheel cover. In this way, the second type of clip may be used to positively lock a wheel cover over a peripheral surface of a wheel rim.

(5) In operation, in the preferred embodiment, a wheel cover has several clips of the first type mounted thereon and at least two of the second type of clip mounted thereon as well, preferably diametrically opposed to one another. The clips of the second type are initially adjusted so that the distal ends of the clip members thereof are in a radially outward position. In this position, the clips of the first type may be installed over the peripheral surface of the wheel rim by manually moving the distal ends radially outwardly until they fit over the periphery of the wheel rim with the spring biasing force of the upper spring, in each case, biasing the distal ends of the clip members downwardly in a position frictionally gripping the wheel rim peripheral surface. At this point, with the distal ends of the clip members of the second type loosely engaging over the peripheral surface of the wheel rim, a tool is inserted within the tool receiving recess of each clip member and is rotated in the appropriate direction to cause the clip members to reciprocate radially inwardly to tighten against the peripheral surface of the wheel rim and, thereby, lock the wheel cover thereon.

(6) In an alternative construction, a gear ring is mounted peripherally on the wheel cover and each clip of the second type includes a threaded shaft having an end opposed to the end carrying the tool receiving recess with the opposed end carrying a gear enmeshed with axially extending gear teeth of the gear ring. In this way, when the threaded shaft of one of the clips of the second type is rotated, these rotations are transmitted via the gear ring to the gears of other threaded shafts of other clips of the second type, thereby allowing simultaneous vertical adjustment of the position of the distal end of the clip members thereof so that a wheel cover may more easily be locked over the peripheral surface of a wheel rim.

Accordingly, it is a first object of the present invention to provide a universal mount for tire rims.

It is a further object of the present invention to provide such a device wherein clips of first and second types are mounted about the periphery of a wheel cover.

It is a yet further object of the present invention to provide such a device wherein clips of a first type include clip members radially floating between two springs that allow radial adjustment against the force of the springs.

It is a yet further object of the present invention to provide such a device wherein clips of a second type include positive adjustment means including a threaded shaft threadably received through threaded holes of a proximal end of a clip member to allow positive radial adjustment thereof.

It is a still further object of the present invention to provide an embodiment wherein a gear ring positively couples the threaded shafts of spaced clips of a second type whereby rotations of one threaded shaft result in corresponding simultaneous rotations of threaded shafts of other clips of the second type.

These and other objects, aspects and features of the present invention will be better understood from the following detailed description of the preferred embodiments when read in conjunction with the appended drawing figures.

BRIEF DESCRIPTION OF THE DRAWINGS

FIG. 5 shows a front view of a wheel ring with six clips in accordance with the teachings of the present invention mounted thereon in peripherally spaced configuration.

FIG. 6 shows a side view of the wheel ring of FIG. 5.

FIG. 7 shows a side view of the wheel cover of FIG. 4.

SPECIFIC DESCRIPTION OF THE PREFERRED EMBODIMENTS

Figure 2:
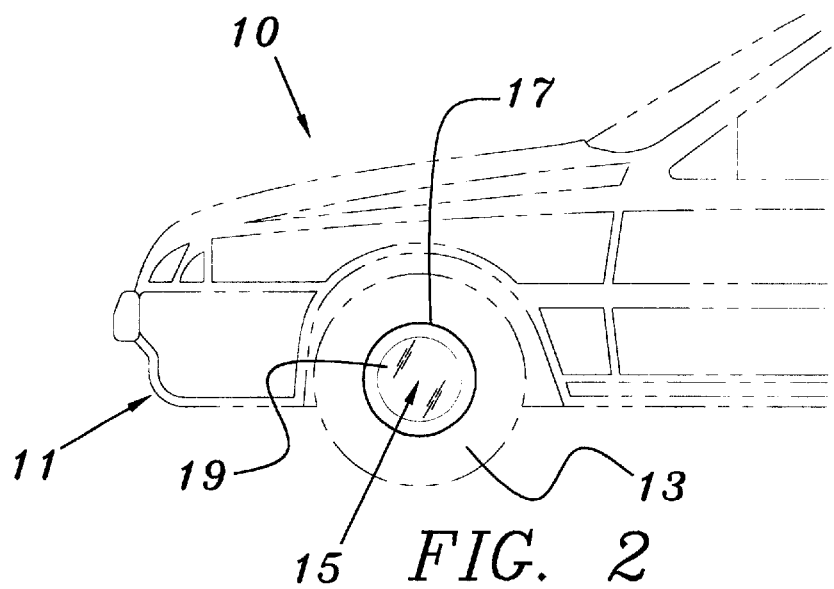
FIG. 2 shows a side view of a full wheel cover as mounted over a wheel rim of a typical automobile with the typical automobile shown in phantom.

FIG. 2 shows the front end 11 of an automobile 10 having a tire 13 mounted on a wheel (not shown) with a wheel cover 15 mounted thereover. The wheel cover 15 has a periphery 17 and a central portion 19 that may be flat or domed or may be of any other desired aesthetic configuration.

Figure 3:
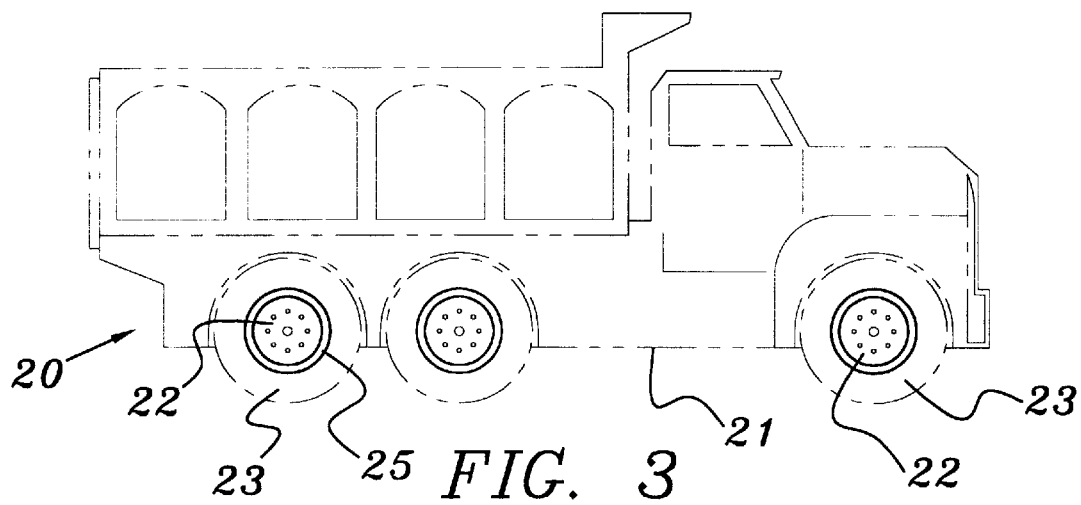
FIG. 3 shows a side view of a truck (in phantom) with wheel rings mounted over the wheel rims thereof.

FIG. 3 shows a truck 20 having a body 21 and a plurality of tires 23 mounted on wheels 22 and with a wheel ring 25 mounted about the periphery of each wheel 22.

Figure 4:
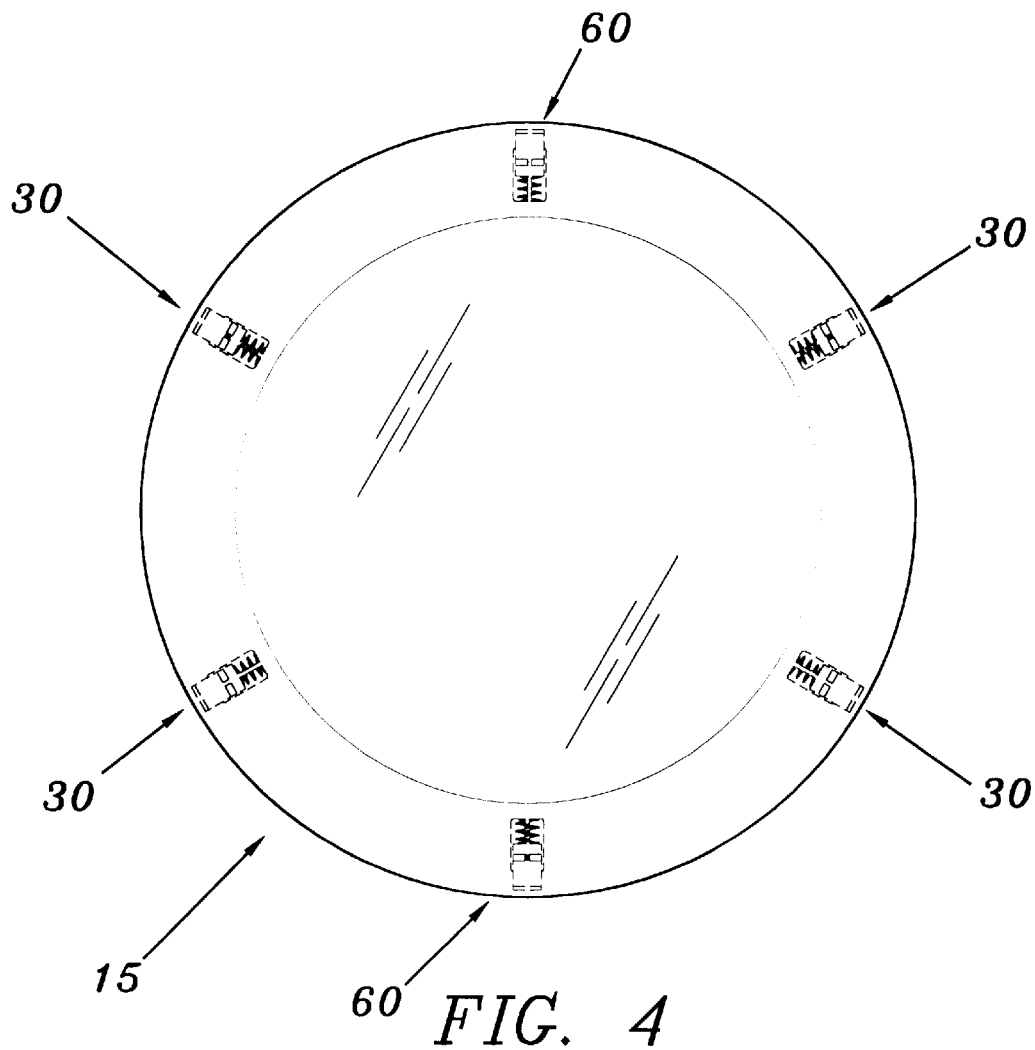
FIG. 4 shows a front view of a full wheel cover having six clips in accordance with the teachings of the present invention mounted thereon in peripherally spaced configuration.

FIG. 4 shows a wheel cover 15 such as is depicted in FIG. 2 having a plurality of clips 30, 60 mounted thereon with the reference numeral 30 referring to clips of a first type as will be described in greater detail hereinafter and with the reference numeral 60 depicting clips of a second type as will be described in greater detail hereinafter. In one alternative, two clips 60 are shown diametrically opposed with four clips 30 also included to either side of the clips 60.

FIG. 5 shows a wheel ring 25 such as is shown in FIG. 3 and with a plurality of clips 30, 60 mounted peripherally therearound. In one alternative, two clips 60 are shown diametrically opposed with four clips 30 also included to either side of the clips 60.

FIG. 6 shows the wheel ring 25 of FIG. 5 from a side view showing the manner by which the clips 30, 60 protrude inwardly in the view of FIG. 5 to engage peripheral surfaces of a wheel rim. The wheel rim 25 can have an increased thickness where the clip attaches to the ring in order to accommodate wheel center portion protrusions.

FIG. 7 shows a side view of the wheel cover 15 also depicted in FIGS. 2 and 4 and with a domed central portion 19 and showing the clips 30, 60 protruding inwardly.

Figure 8:
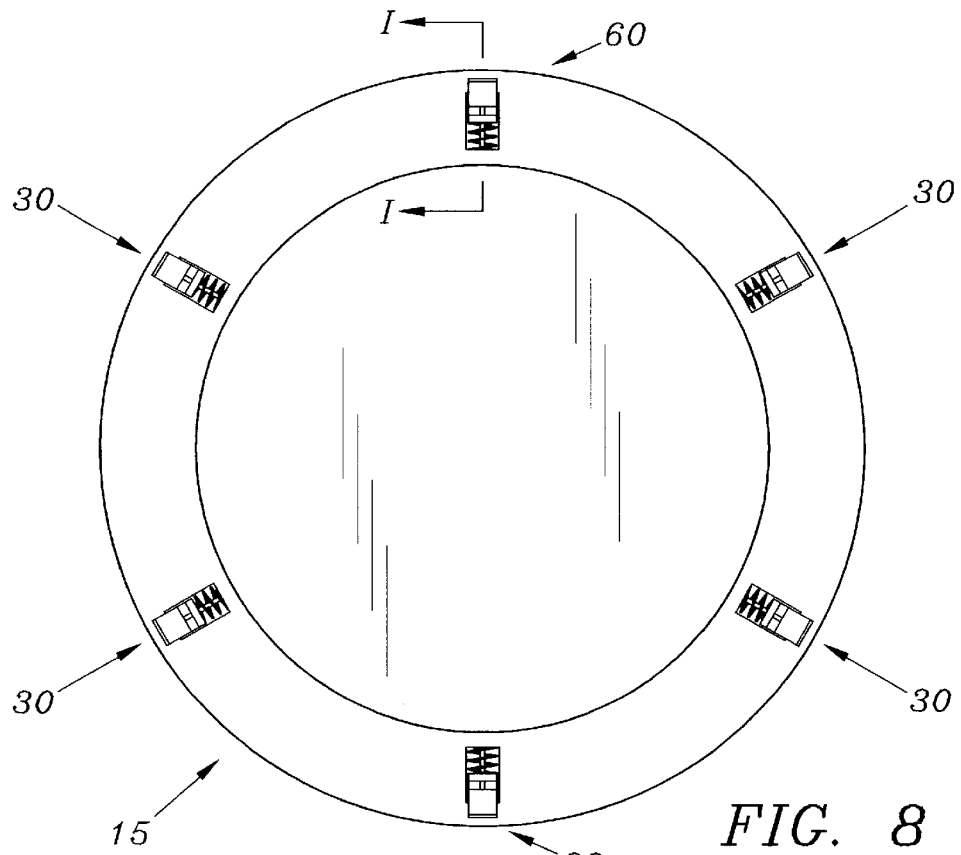
FIG. 8 shows a rear view of the wheel cover of FIG. 4 showing inclusion of six clips.

FIG. 8 shows a rear view of the wheel cover 15 showing more clearly the clips 30 and 60.

Figure 9:
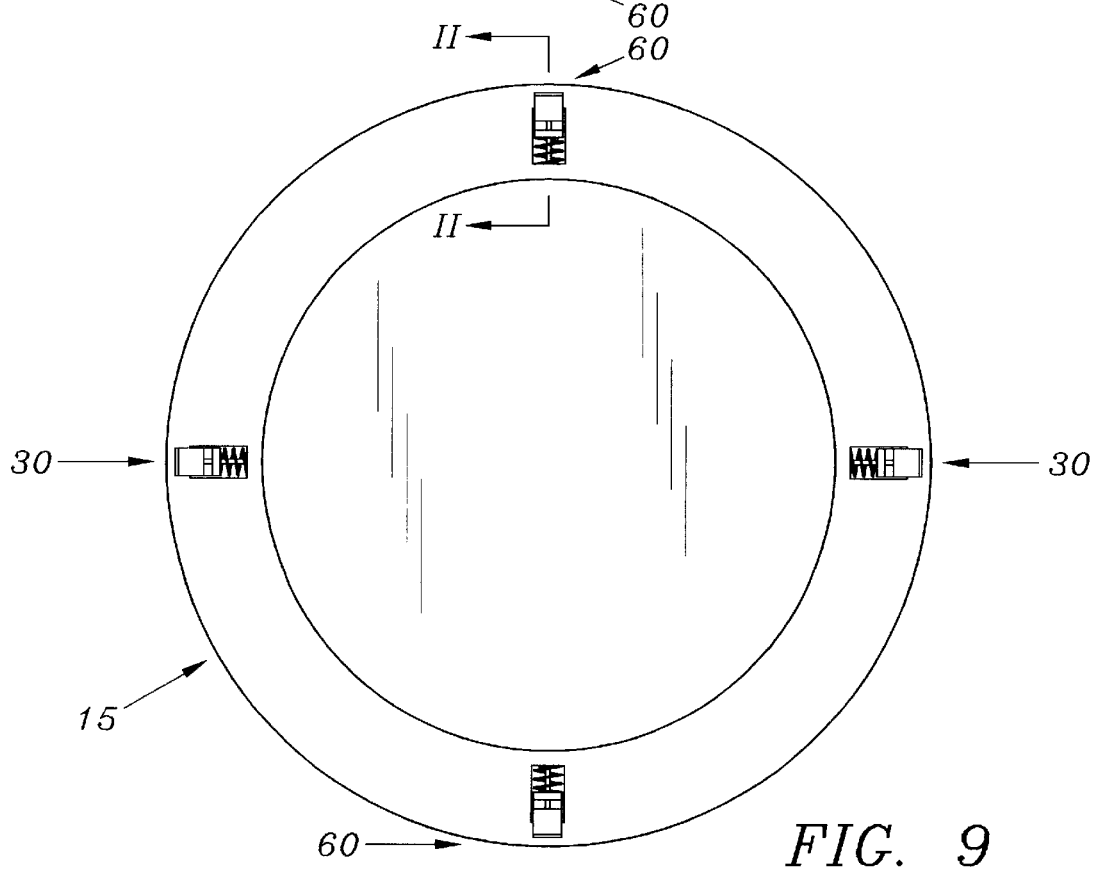
FIG. 9 shows a rear view of the wheel cover of FIG. 4 but with four clips mounted thereon.

FIG. 9 shows the wheel cover 15 but modified so that it only includes four clips, for example, two diametrically opposed clips 30, and two diametrically opposed clips 60.

Figures 10, 11:
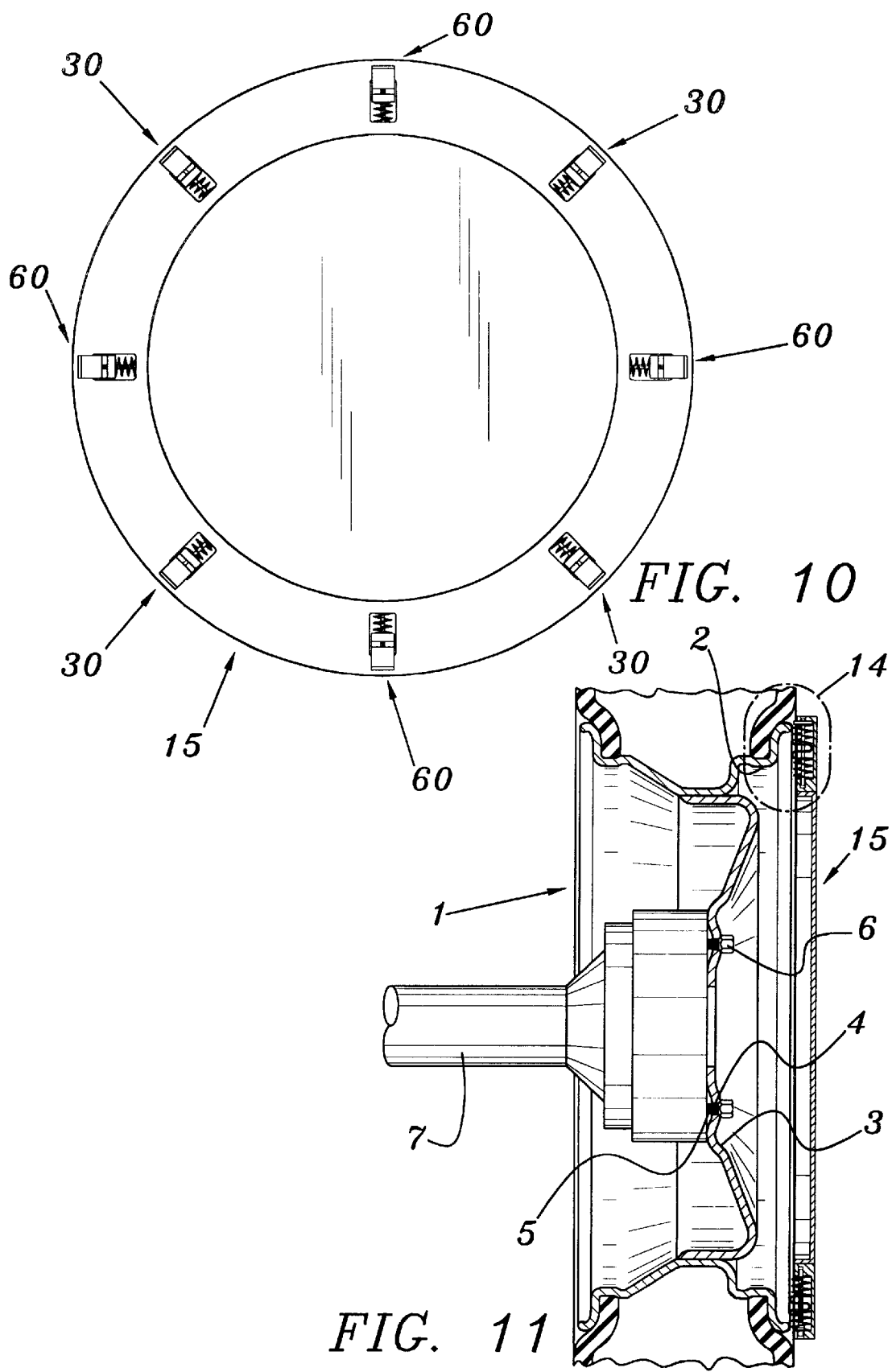
FIG. 10 shows a rear view of the wheel cover of FIG. 4 but with eight clips mounted thereon.
FIG. 11 shows a cross-sectional view similar to that of the prior art view of FIG. 1 but depicting a wheel cover with a plurality of clips in accordance with the teachings of the present invention mounted thereon.

FIG. 10 shows a further alternative wherein the wheel cover 15 includes eight clips including, for example, four clips 30 and four clips 60.

Of course, in describing the locations of the clips 30, 60 in the various configurations of wheel covers and clips described hereinabove, the descriptions of the particular locations of the various clips 30, 60 should be considered merely exemplary. Any desired combination of the types of clips 30, 60 may be employed. In fact, it may be advantageous to only use one clip 60 with the rest of the clips being of the type designated by the reference numeral 30. Alternatively, if desired, all of the clips employed may be of the type designated by the reference numeral 60 or the reference numeral 30, as desired.

Figure 1:
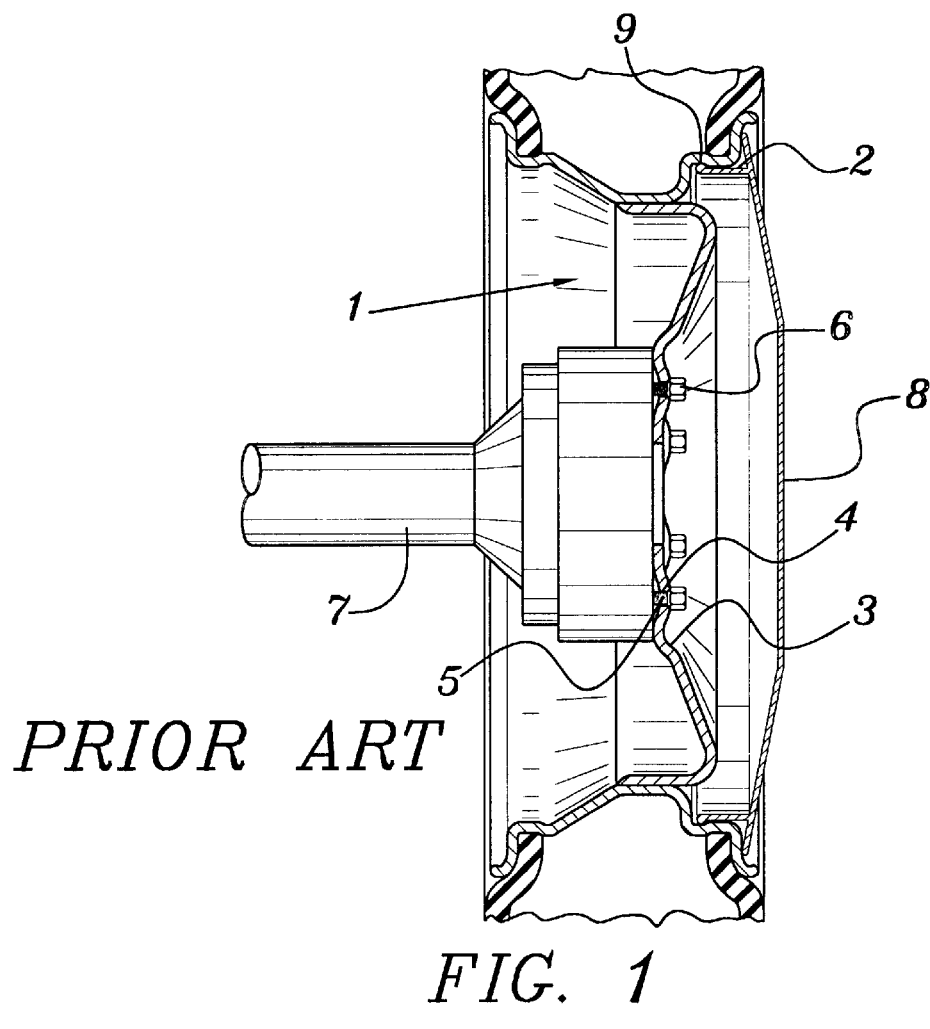
FIG. 1 shows a cross-sectional view of a prior art configuration of a vehicle axle, wheel and full wheel cover.
Figure 14:
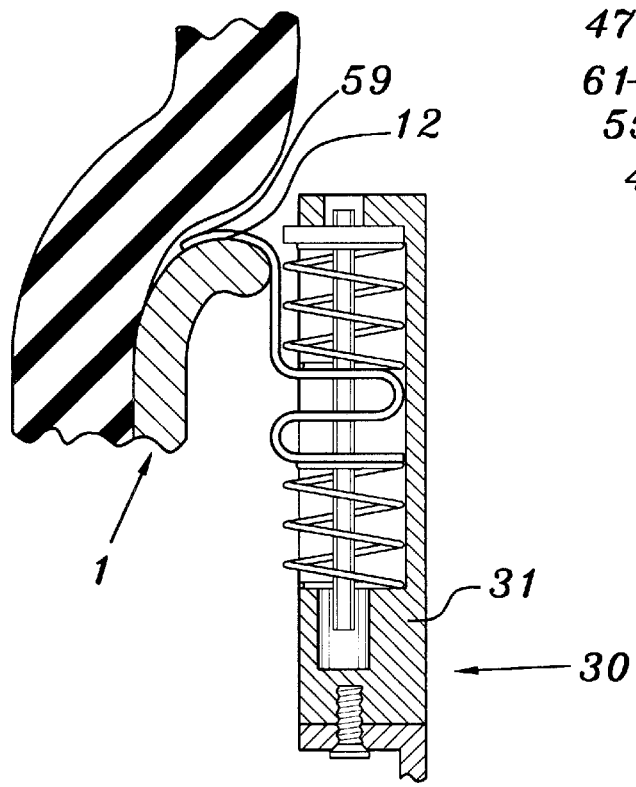
FIG. 14 shows a clip of the first type as depicted in FIG. 11, partially in cross-section, and shown in mounted configuration over a peripheral surface of a wheel rim.

FIG. 11 shows a view similar to that of FIG. 1 including depiction of a wheel 1 having a peripheral surface 2 that was used by the wheel cover 8 with its annular protrusion 9. With reference, also, to FIG. 14, it is seen that the wheel 1 also has a peripheral surface 12 that is used in accordance with the teachings of the present invention (as will be described in greater detail hereinafter) to hold a wheel cover such as the wheel cover 15 thereon.

Figure 12:
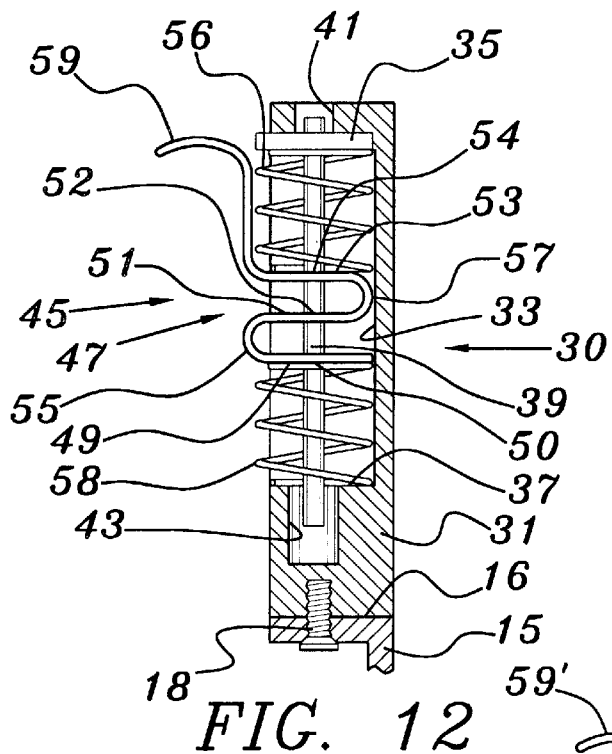
FIG. 12 shows a clip of the first type, partially in cross-section.

With reference to FIGS. 12 and 14, a first type of clip is generally designated by the reference numeral 30 and is seen to include a clip housing 31 that has a recess 33 with a top wall 35 and a bottom wall 37. A smooth-walled shaft 39 extends into an opening 41 in the top wall 35 and into an opening 43 in the bottom wall 37. The housing 31 is mounted on a surface 16 of the wheel cover 15 by suitable means such as the screw 18 or by welding. The wheel cover 15 or ring 25 may be injection molded together with housing 31.

A clip member 45 includes a proximal end 47 including three flat parallel portions 49, 51 and 53, and a curved portion 55 between the flat portions 49 and 51 and a curved portion 57 between the flat portions 51 and 53 with the portions 49, 55, 51, 57 and 53 combining together to form an undulating proximal end of the clip member 45.

The flat portion 49 has an opening 50 therethrough, the flat portion 51 has an opening 52 therethrough and the flat portion 53 has an opening 54 therethrough. The openings 50, 52 and 54 are aligned with one another and receive, therethrough, the shaft 39. Springs 56 and 58 surround the shaft 39, with the spring 56 being located above and engaging the flat portion 53 of the clip member 45 and with the spring 58 being below the proximal end 47 of the clip member 45 and engaging the undersurface of the flat portion 49. In this way, the clip member 45 is supported in a floating manner freely able to move up and down in the view of FIGS. 12 and 14 only restrained from such movements by the spring force of the springs 56 and 58.

The clip member 45 also includes an arcuate distal end 59 that is seen in FIG. 14 in its intended mode of use, overlying the surface 12 of the wheel 1.

As should be understood from FIGS. 12 and 14, the user may easily push down on the end 59 of the clip member 45 or pull up on it, as desired, and the clip member 45 will be guided in vertical movements in the view of FIGS. 12 and 14 by the springs 56 and 58 and the shaft 39 extending through the openings 50, 52 and 54 of the portions 49, 51 and 53, respectively.

Figure 13:
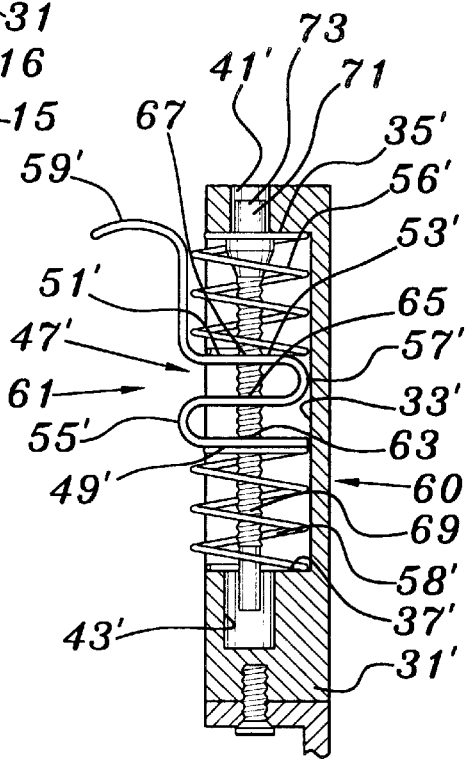
FIG. 13 shows a clip of the second type, partially in cross-section.

FIG. 13 shows the second type of clip 60. The clip 60 has many features that are the same as the features of the clip 30 and those features in common are designated in FIG. 13 using like primed reference numerals as compared to FIGS. 12 and 14. The clip member 61 shown in FIG. 13 is identical to the clip member 45 shown in FIG. 12 except that the smooth holes 50, 52 and 54 through the portions 49, 51 and 53, respectively, have been replaced with threaded holes 63, 65 and 67 extending through the respective portions 49', 51' and 53'. The smooth shaft 39 of the clip 30 has been replaced with a threaded shaft 69 that is threadably received through the threaded openings 63, 65 and 67. The threaded shaft 69 has an upper end 71 that extends within the opening 41' and has a tool receiving recess 73 shown in phantom in FIG. 13 designed to receive the distal end of a tool such as, for example, an Allen wrench.

As should be understood from FIG. 13 and the explanation set forth above, when a tool end (not shown) is received within the recess 73 of the threaded shaft 69 and is rotated, rotation in one direction causes the clip member 61 to move downwardly in the view of FIG. 13 whereas rotation in the opposite direction causes the clip member 61 to move upwardly in the view of FIG. 13. The configuration of the recess 33' as compared to the proximal portion 47' of the clip member 61 prevents relative rotation between the clip member 61 and the housing 31' so that rotations of the threaded shaft 69 translate to direct reciprocations in one direction or the other of the clip member 61.

As should now be understood, when viewing FIGS. 13 and 14 and imagining the clip 60 in the view of FIG. 14, rotations of the threaded shaft 69 that cause the clip member 61 to move downwardly in the view of FIG. 13 will cause the distal end 59' thereof to lock over the surface 12 of the wheel 1 whereas reciprocations of the clip member 61 upwardly in the view of FIG. 13 will cause the distal end 59' to be released from a locking configuration over the surface 12 of the wheel 1.

As should now be understood from the detailed description of the clips 30 and 60, the clips 30 may easily be snapped over a peripheral surface of a wheel while the clips 60 may be operated in the manner described above to reciprocate their clip members 61 to a locked configuration over a peripheral surface of a wheel. Thus, it is preferable that the clips 60 be used in diametrically opposed pairs so that those pairs of clips 60 may be operated to positively and strongly clamp over a peripheral surface of a wheel to strongly lock a wheel cover thereon.

Figure 15:
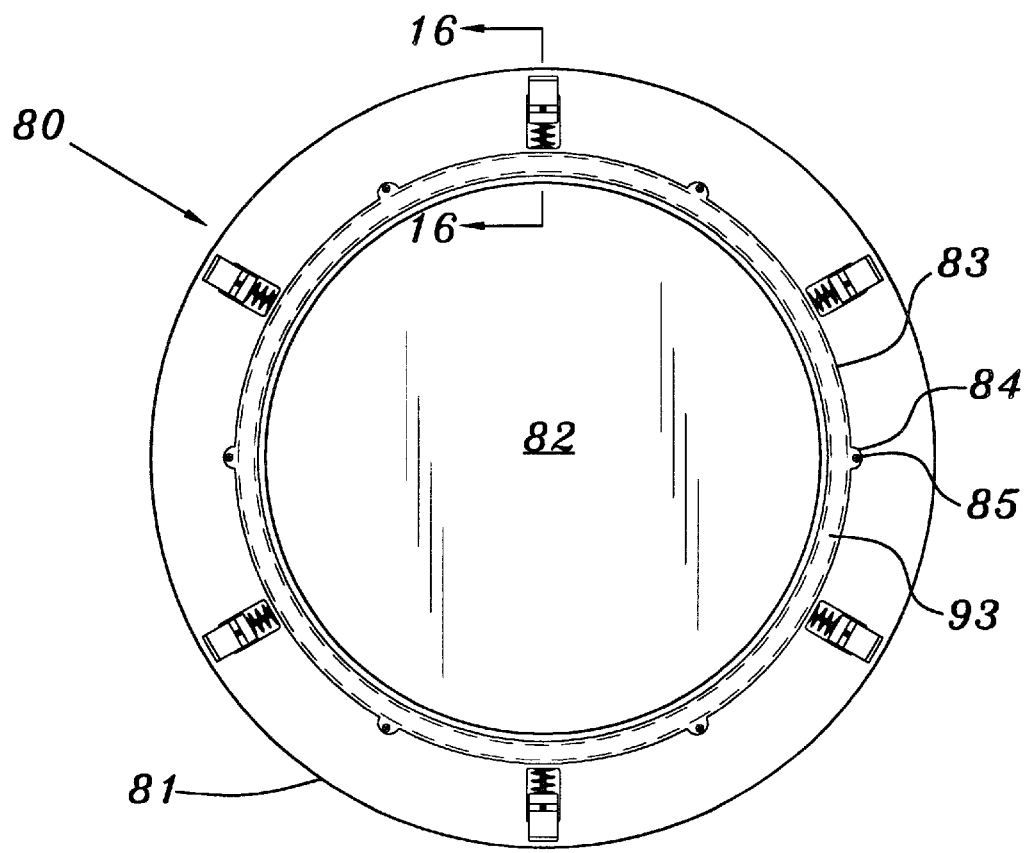
FIG. 15 shows a rear view of a modified wheel cover having six clips peripherally mounted thereon as well as a gear ring.

FIG. 15 shows a wheel cover 80 comprising an alternative embodiment of the present invention. The wheel cover 80 includes a periphery 81 as well as a central portion 82 that may be flat or domed as desired. The teachings that will be described with reference to FIGS. 15 and 16 are equally applicable to the use of a wheel ring rather than a wheel cover.

Figure 16:
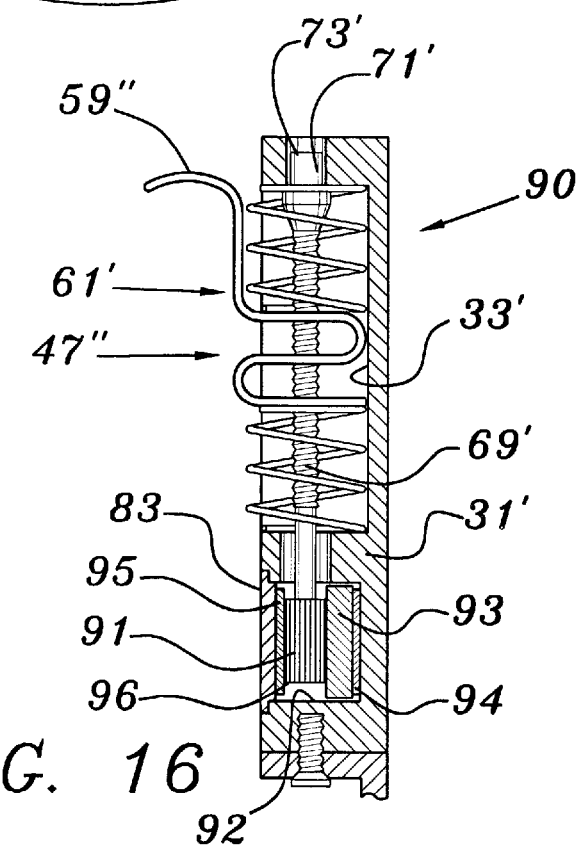
FIG. 16 shows a clip of the second type, similar to that of FIG. 13, but modified to include a gear enmeshing with the gear ring also shown in FIG. 15.

FIG. 16 shows a clip 90 that is similar to the clip 30 illustrated in FIGS. 12 and 14 and to the clip 60 illustrated in FIG. 13. As such, like structures in the clip 90 as compared to the clips 30 and 60 will be depicted using liked primed or double-primed reference numerals as the case may be. In FIG. 16, the threaded shaft 69' is modified at its lower end through the addition of a gear 91. The housing has an enlarged chamber 92 open at its sides to allow a gear ring 93 to extend therethrough. The gear ring 93 is also shown in phantom in FIG. 15 with a cover 83 shown mounted thereover by virtue of tabs 84 and fasteners 85.

Bearing discs 94 and 95 surround the gear 91 and gear ring 93. The gear ring 93 has a multiplicity of circumferentially spaced teeth that extend in the radial direction in the view of FIG. 15 and enmesh with the teeth 96 of the gear 91.

As should be self-evident, when a tool end (not shown) is inserted within the tool receiving recess 73' of the threaded shaft 69' and is rotated, those rotations cause simultaneous rotations of the gear 91 thereby causing rotations of the gear ring 93 in the clockwise or counterclockwise direction in the view of FIG. 16 depending upon the direction of rotation of the shaft 69'. Thus, where a plurality of clips 90 are mounted in various locations about the periphery of the wheel cover 80, rotations of one threaded shaft 69' are simultaneously translated to identical rotations of the other threaded shafts 69' on the other clips 90 that are also coupled with the gear ring 93. In this way, the user may equally move the distal ends 59" of the clip members 61' an equal amount for each clip member 61' so that the user may simultaneously adjust the vertical position of the distal ends 59" of the clip members 61' about the periphery of the wheel cover 80.

Accordingly, as described hereinabove in the preferred embodiments of the present invention, where clips 30 and 60 or 30, 60 and/or 90 are employed, the user may easily adapt a particular wheel cover to wheels of differing shapes and configurations so long as the differences between them are within the tolerances of the distances that the various clip members 45, 61 and 61' may move within the respective chambers 33 and 33'.

As such, an invention has been disclosed in terms of preferred embodiments thereof which fulfill each and every one of the objects of the invention as set forth hereinabove and provide a new and useful universal mount for tire rims of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. In a wheel cover or wheel ring including a surface adapted to cover a portion of a vehicle wheel, the improvement comprising a universal mount adapted to mount said wheel cover or wheel ring on vehicle wheels of differing configurations, comprising:
    a) a plurality of clips mounted about a periphery of said wheel cover or wheel ring;
    b) each of said clips including:
        i) a housing mounted on said wheel cover or wheel ring and including an internal chamber open on one side;
        ii) a shaft mounted in said chamber;
        iii) a clip member having a proximal end and a distal end, said proximal end including an opening receiving said shaft therethrough and said distal end including a terminus shaped to engage a peripheral surface of a wheel; and
        iv) means for maintaining a vertical position of said clip member with respect to said shaft.

2. The improvement of claim 1, wherein said shaft has smooth outer walls.

3. The improvement of claim 2, further including a first spring mounted about said shaft above said proximal end of said clip member and a second spring mounted about said shaft below said proximal end of said clip member.

4. The improvement of claim 1, wherein said means for maintaining comprises a first spring mounted about said shaft above said proximal end of said clip member and a second spring mounted about said shaft below said proximal end of said clip member.

5. The improvement of claim 4, wherein said proximal end of said clip member comprises an undulating structure including three horizontal portions with adjacent ones of said horizontal portions connected by curved portions, each horizontal portion having an opening receiving said shaft.

6. The improvement of claim 1, wherein said proximal end of said clip member comprises an undulating structure including three horizontal portions with adjacent ones of said horizontal portions connected by curved portions, each horizontal portion having an opening receiving said shaft.

7. The improvement of claim 1, wherein said means for maintaining comprises threads on said shaft and complimentary threads in said opening.

8. The improvement of claim 7, further including a first spring mounted about said shaft above said proximal end of said clip member and a second spring mounted about said shaft below said proximal end of said clip member.

9. The improvement of claim 8, wherein said proximal end of said clip member comprises an undulating structure including three horizontal portions with adjacent ones of said horizontal portions connected by curved portions, each horizontal portion having a threaded opening threadably receiving said shaft.

10. The improvement of claim 7, wherein said shaft carries a gear having teeth, said wheel cover carrying a gear ring having peripheral gear teeth enmeshed with said teeth of said gear and with further teeth of a further gear of a further threaded shaft of a further clip, whereby rotations of said shaft cause rotations of said gear ring and of said further threaded shaft.

11. The improvement of claim 1, wherein said plurality of clips comprises four clips.

12. The improvement of claim 1, wherein said plurality of clips comprises six clips.

13. The improvement of claim 1, wherein said plurality of clips comprises eight clips.

14. The improvement of claim 1, wherein said plurality of clips comprises at least one clip of a first type and at least one clip of a second type, said first type of clip including a shaft with smooth outer walls and said means for maintaining comprising a first spring mounted about said shaft above said proximal end of said clip member and a second spring mounted about said shaft below said proximal end of said clip member, and said second type of clip including a threaded opening in said proximal end of said clip member and said means for maintaining comprising complimentary threads on said shaft.

15. The improvement of claim 14, wherein said plurality of clips comprises a first plurality of said first type of clip and a second plurality of said second type of clip.

16. In a wheel cover including a surface adapted to cover a portion of a vehicle wheel, the improvement comprising a universal mount adapted to mount said wheel cover on vehicle wheels of differing configurations, comprising:
    a) a plurality of clips mounted about a periphery of said wheel cover;
    b) each of said clips including:
        i) a housing mounted on said wheel cover and including an internal chamber open on one side;
        ii) a shaft mounted in said chamber;
        iii) a clip member having a proximal end and a distal end, said proximal end including an undulating structure including three horizontal portions with adjacent ones of said horizontal portions connected by curved portions, each horizontal portion having an opening receiving said shaft and said distal end including a terminus arcuately shaped to engage a peripheral surface of a wheel; and
        iv) means for maintaining a vertical position of said clip member with respect to said shaft.

17. The improvement of claim 16, wherein said shaft has smooth outer walls and said means for maintaining comprises a first spring mounted about said shaft above said proximal end of said clip member and a second spring mounted about said shaft below said proximal end of said clip member.

18. The improvement of claim 16, wherein said means for maintaining comprises threads on said shaft and complimentary threads in said openings.

19. The improvement of claim 16, wherein said plurality of clips comprises at least one clip of a first type and at least one clip of a second type, said first type of clip including a shaft with smooth outer walls and said means for maintaining comprises a first spring mounted about said shaft above said proximal end of said clip member and a second spring mounted about said shaft below said proximal end of said clip member, and said second type of clip including threads in said openings of said proximal end of said clip member and said means for maintaining comprising complimentary threads on said shaft.

20. The improvement of claim 19, wherein said plurality of clips comprises a first plurality of said first type of clip and a second plurality of said second type of clip.

\* \* \* \* \*